(12) United States Patent
Batista

(10) Patent No.: US 6,954,746 B1
(45) Date of Patent: Oct. 11, 2005

(54) BLOCK CORRUPTION ANALYSIS AND FIXING TOOL

(75) Inventor: Carlos M. Batista, Amadora (PT)

(73) Assignee: Oracle International Corporation, Redwood Shores, CA (US)

( * ) Notice: Subject to any disclaimer, the term of this patent is extended or adjusted under 35 U.S.C. 154(b) by 468 days.

(21) Appl. No.: 09/872,407

(22) Filed: Jun. 1, 2001

(51) Int. Cl.[7] .............................................. G06N 5/00
(52) U.S. Cl. ..................................... 706/45; 709/219
(58) Field of Search .......................... 706/45; 709/219, 709/231; 713/201

(56) References Cited

U.S. PATENT DOCUMENTS

| | | | |
|---|---|---|---|
| 5,737,520 A | | 4/1998 | Gronlund et al. |
| 6,256,643 B1 | | 7/2001 | Cork et al. |
| 6,571,282 B1 | * | 5/2003 | Bowman-Amuah ......... 709/219 |
| 2002/0161908 A1 | * | 10/2002 | Benitez et al. ............... 709/231 |
| 2002/0184527 A1 | * | 12/2002 | Chun et al. .................. 713/201 |

OTHER PUBLICATIONS

Austin, David et al. "Chapter 23 –Diagnosing and Correcting Problems" *Using Oracle 8* Que, Indianapolis, IN (1998), pp. 1–19, available at http://docs.rinet.ru/O8/ch23/ch23/htm.

Dialeris, Connie et al. "13 Performing Operating System Backups" *Oracle8i Backup and Recovery Guide*, Release 8.1.5, Part No. A67773–01, Oracle Corporation, Redwood City, CA (Feb. 1999), pp. 1–17, available at http://www.csee.umbc.edu/help/oracle8/server.815/a67773/osbackup.htm.

Durbin, Jason "9 Offline Database Verficiation Utility" *Oracle8i Utilities* Release 8.1.5, Part No. A67792–01, Oracle Corporation, Redwood City, CA (Feb. 1999) pp. 1–3, available at http://www.csee.umbc.edu/help/oracle8/server.815/a67792/ch09.htm.

Maslovka, Verkhnaya "DB Verify" pp. 1–3, available at http://www.fors.com/velpuri2/Backup%20and%20Recovery/7%20DBverify.

Maslovka, Verkhnaya "BBED (Block Browser/Editor)", pp. 1–5, available at http://www.fors.com/velpuri2/Oracle%20block%20structure/BBED.

Kooiman, Will "Life is DUL Without It!" *Dallas Oracle User Group* J. Stouffer, Ed., Dallas, TX (Jul. /Aug. 1997), Issue 4, available at http://www.doug.org/news/doug0708.PDF.

Dolev, Danny et al. "Correcting Faults in Write–Once Memory" *Proceedings of the 16th Annual ACM Symposium on Theory of Computing* (Dec. 1984) pp. 225–229.

Tannebaum, Andrew S. and Robbert van Renesse "Distributed Operating Systems" *Computing Surveys* (Dec. 1985) 17(4):419–470.

International Search Report dated Dec. 17, 2002 for PCT/US02/16246.

* cited by examiner

*Primary Examiner*—Wilbert L. Starks, Jr.
(74) *Attorney, Agent, or Firm*—Bingham McCutchen LLP

(57) ABSTRACT

A graphical user interface receives data in the form of a data block. The graphical user interface displays the data and metadata associated with the data block. The graphical user interface also displays validation information computed by the graphical user interface or an associated validation module. The displayed data is editable. The graphical user interface allows a user to navigate through the various data blocks stored in a data file, to located selected blocks, such a corrupted blocks.

28 Claims, 5 Drawing Sheets

BLOCK CORRUPTION ANALYSIS AND FIXING TOOL

FIELD OF THE INVENTION

The invention relates to computer systems, and more particularly to systems and methods for graphically displaying, analyzing and repairing data blocks.

BACKGROUND

In modern computer file systems, such as data storage systems and databases, data is commonly stored in data files. One way to organize the structure of these data files is to break down the data into data blocks.

A "data block" is a structure composed of the underlying data stored in the data block, and associated metadata describing attributes of the data block. The soundness of these data blocks is essential to the good working of the file system. It is unavoidable that, given the enormous installed base of file systems, data block corruption problems will arise due to hardware and/or software flaws. A data block can become corrupted under various circumstances. For example, through a software or hardware malfunction, data is erroneously written to the file. This erroneous data causes the file system to not recognize the block as valid, and thus makes it impossible for the file system to read or write to the block.

Corruption can assume two forms: physical or logical. With physical corruption, the data is totally inaccessible by the file system since the corruption itself is hardware-based (eg: hard disk failure). With logical corruption, the data itself is accessible at a low level, such as the operating system level, but logically incorrect to the higher-level software, such as the various databases and other applications (eg: Split blocks, incorrect checksums), running on the file system. Logical corruption can occur for a variety of reasons (e.g. software bug, hard disk write failure, OS bug, etc. . . . ).

Data corruption is a significant problem for file system users. Much of the world's most valuable information is stored in computerized file systems. Losses of data due to data corruption result in wasted time and money. Technical support people spend large amounts of time and money on data recovery operations, to attempt to identify and repair corrupt data.

Various tools have been developed to address the problems with data corruption within data blocks on file systems. For example, BBED (Block Browser/Editor) is a character-based, command line-driven block editor, developed for use with Oracle data files. This editor allows a user to go into a particular data block, and fix corrupted values within the data or metadata portions of the block. The user, however, has to already know the location of the corruption ahead of time, and supply this location to the editor. BBED does not allow the user to scan or view the data blocks within a data file, to locate corrupt blocks.

DBVERIFY is another tool that has been developed to assist with data block corruption in Oracle data files. DBVERIFY is also a character-based, command-line driven tool. It allows a user to scan through the data blocks within a data file, to check the blocks for corruption. DBVERIFY does not allow the user to view the contents of the data or metadata within the data block, it does not allow the user to edit data blocks, and it does not indicate which portion of the data block is corrupt.

Thus, there is a need for a tool that allows a user to view, analyze and repair corruption in data blocks of data files stored in a file system. Furthermore, it is useful for various people, such as training staff, system developers, etc., to be able to view the low-level details about the data and metadata contained within a data block.

SUMMARY OF THE INVENTION

The present invention is directed towards methods and systems for displaying, analyzing and repairing corruption within data blocks of a data file on a file system.

In an aspect of an embodiment of the invention, metadata associated with a data block is displayed graphically on a computer screen, with at least one metadata item being separate and identifiable from the rest of the metadata.

In another aspect of an embodiment of the invention, data validation results about metadata associated with a data block are displayed graphically, alongside the metadata itself.

In another aspect of an embodiment of the invention, metadata associated with a data block is interactively edited.

In another aspect of an embodiment of the invention, data stored within the data block is displayed graphically on a computer screen in a high-level format, according to a structure of the data.

DETAILED DESCRIPTION OF THE PREFERRED EMBODIMENTS

Figure 1:
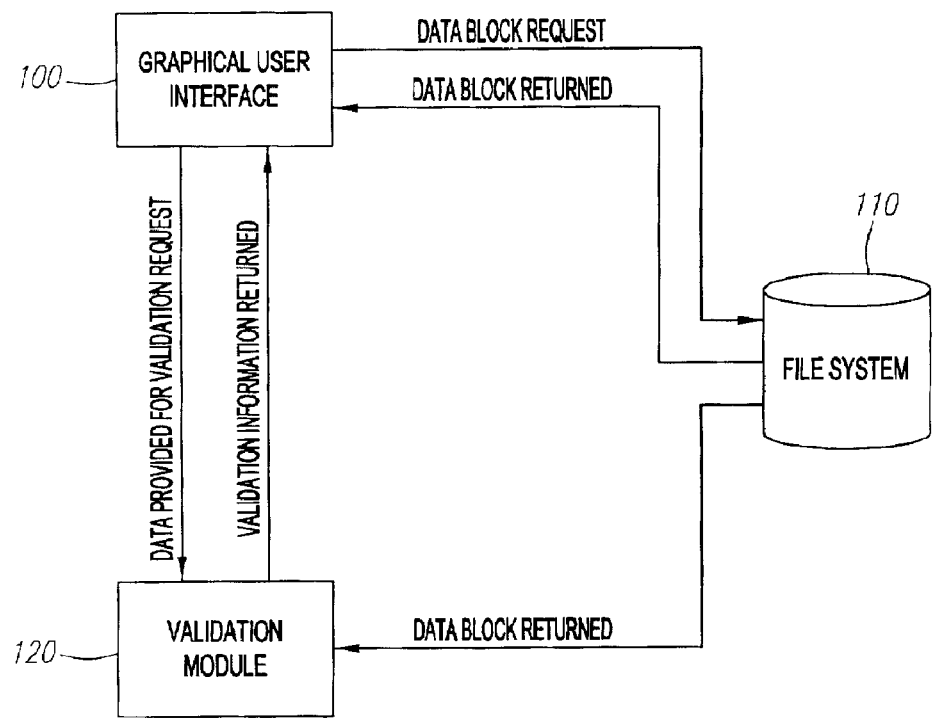
FIG. 1 represents a system for displaying and verifying data blocks, in accordance with an embodiment of the invention.

For the sake of simplicity, the embodiments discussed herein will refer to the Oracle file system, from Oracle Corp. of Redwood Shores, Calif. The invention is not, however, limited to any particular file system. A system of an embodiment of the invention is shown in FIG. 1. The system includes a graphical user interface 100. The graphical user interface 100 receives commands from the user, routes the commands to the other modules of the system, and displays data received from the other modules of the system. The system also includes a file system 110. The file system 110 stores the various data files which provide data to the graphical user interface 100. The system also includes a validation module 120. The validation module receives data from the graphical user interface 100, and optionally from the file system 110. The validation module 110 performs various data validation operations on the data blocks, and returns the results of those validations to the graphical user interface for display. The graphical user interface 100 can also perform data validation operations on the data blocks.

Figure 2:
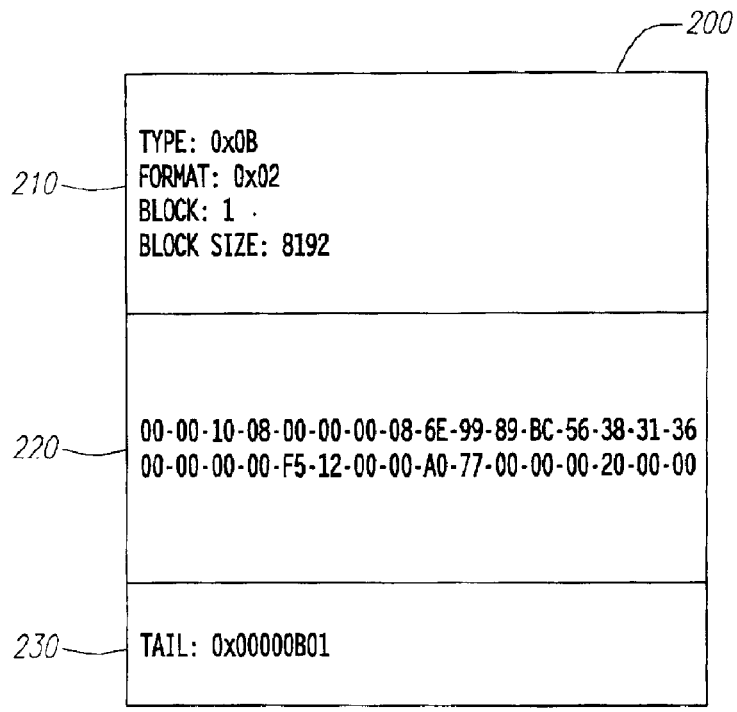
FIG. 2 is an example of a data block, in accordance with an embodiment of the invention.

In an embodiment of the invention, data is stored in a data file, which comprises a series of data blocks. An example of a data block layout is shown in FIG. 2. The data block 200 includes a header 210, a body 220, and a tail 230. The header 210 contains metadata about the data block. This metadata includes items such as the format of the data block, the type of the data block, the size of the data block, and the ID number of the data block. The body 220 contains the actual data stored in the data block, represented as a series of hexadecimal values. This data can be any information desired to be stored in the data storage system. The tail 230 contains consistency information, which is used to verify that the beginning and the end of the data block match. In an embodiment, this consistency information is a combination of values from the metadata stored in the header 210, generated at the time the data block is first initialized.

In an embodiment using version 8 of the Oracle file system ("Oracle 8"), the header 210 and the tail 230 include the metadata listed in Table 1 below.

TABLE 1

| Metadata element | Size | Description |
|---|---|---|
| Type | 1 byte | Block Type |
| Format | 1 byte | Block Format. In Oracle 8 this is 2. |
| Filler | 1 byte | Not currently used |
| RDBA | 2 bytes | Relative database address of the block |
| SCNBase | 2 bytes | SCN Base |
| SCNWrap | 2 bytes | SCN Wrap |
| Sequence | 1 byte | Sequence number. Incremented for every change made to the block at the same SCN. |
| Flag | 1 byte | Flag |
| ChkVal | 2 bytes | Optional check value for the block |
| Filler | 1 byte | Not currently used |
| Tail | 4 bytes | Consistency information used to verify the beginning and the end of the block are of the same version. Contains the lower order 2 bytes of SCNBase, plus the Type, plus the Sequence. |

From time to time, it is desirable to view the data and the metadata contained within the data block 200. For example, when a data block becomes corrupted, it is desirable to view the data in order to locate and fix the corruption. It is also useful to view data blocks during the process of training users such as support professionals or database analysts. It is further useful to view data blocks in order to test the effect of various proposed changes to a data block.

Figure 3:
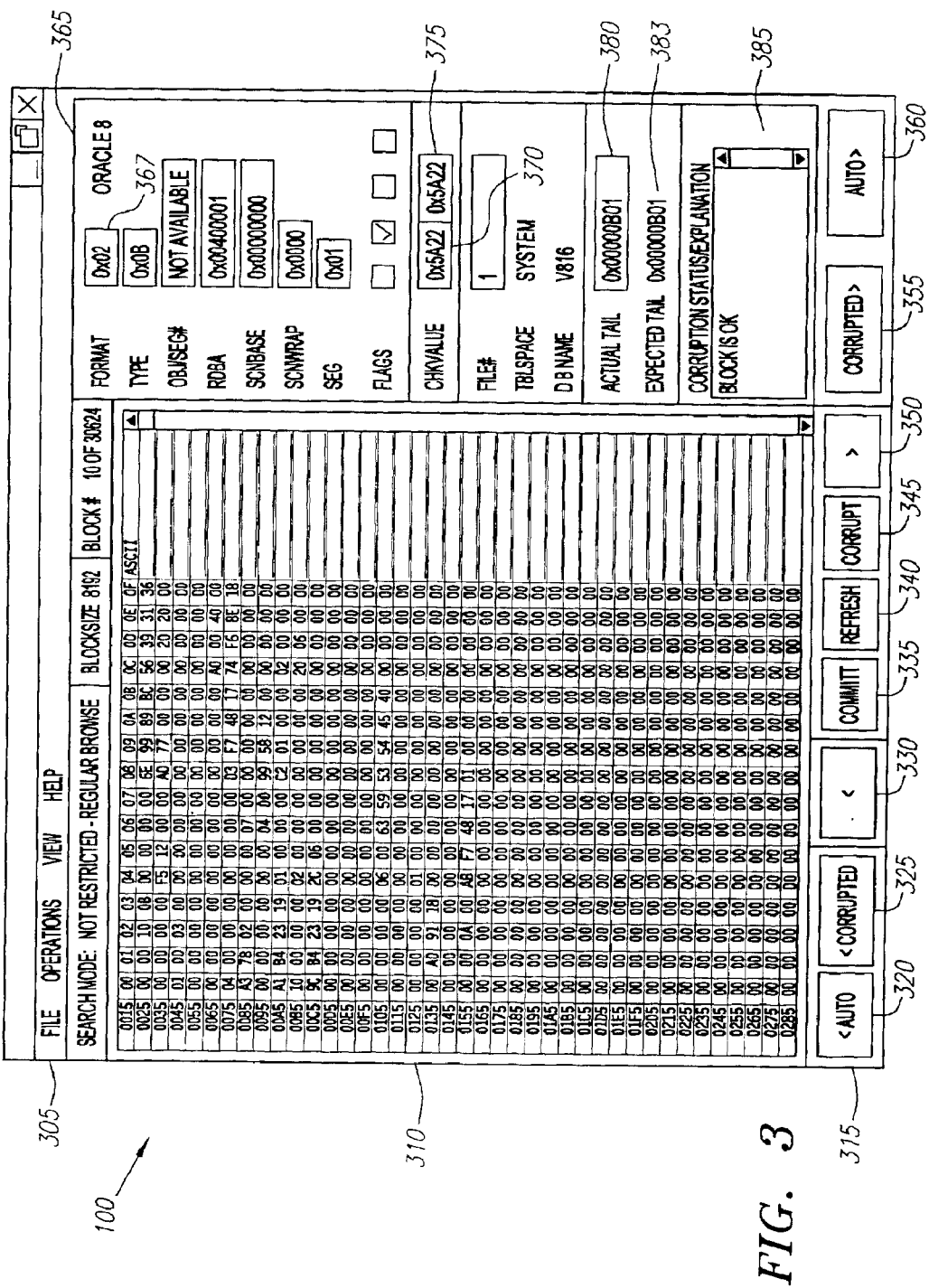
FIG. 3 is a graphical user interface screen, in accordance with an embodiment of the invention.

The data block is viewed using the graphical user interface 100, shown in FIG. 3. The graphical user interface 100 is displayed on a display device, such as a CRT monitor or a television set attached to a computer. The graphical user interface 100 contains a menu bar 305. The menu bar 305 contains several menus, each of which contains a list of options a user can select from. The user can select from these options by activating a cursor control such as a computer mouse or trackball, and causing a cursor linked to the selector to target the desired option. Examples of the various options of an embodiment will be discussed in more detail below.

The graphical user interface 100 also contains a data display region 310. The data display region 310 displays the data contained in the data block. In the example embodiment of FIG. 3, the data is displayed as a series of hexadecimal values. The hexadecimal values are displayed in a series of rows, with each row containing the next sequence of hexadecimal values in the data block after the row above. The data display region 310 also displays an ASCII value representation for each row of data. The location of a particular data item within the data block is determined by adding the offset value in the column header of the column containing the data to the row value in the row header of the row containing the data item. In an alternate embodiment, where the structure definition of the data itself is known, the data display region 310 displays the data in accordance with the structure definition. For example, where the data in the data block is a database table, and the structure definition defines the rows and columns of the database, then the data is displayed in the row/column format of the database table. Similarly, where the data in the data block is, for example, a graphic image such as a photograph, and the structure definition defines the colors of the various parts of the photograph, then the data is displayed as a color image.

The graphical user interface 100 also contains a button bar 315. The button bar 315 contains a collection of buttons that, when activated, cause various actions to be taken on the data block. The button bar has an auto-back button 320 which, when activated, causes the graphical user interface 100 to automatically load in the previous data blocks in the data file being examined, and sequentially display them. The button bar has a corrupted-back button 325, which, when activated, causes the graphical user interface 100 to scan backwards through the data blocks of the data file and load in the next corrupted data block encountered. The button bar has a step-back button 330, which, when activated, causes the immediately previous data block in the data file to be loaded into the graphical user interface 100. The commit button 335, when activated, causes any changes made to the data or metadata displayed in the graphical user interface 100 to be written back to the data block. The refresh button 340, when activated, causes the data and metadata displayed in the graphical user interface 100 to be updated to reflect the current state of the data/metadata, including any changes made to that data/metadata by other users of the data block.

The corrupt button 345, when activated, causes the data block to be marked "software corrupt." This software corrupt marking in turn causes the data block to be recognized as a corrupt block by other computer processes, such as the file system, data storage system or database that access the data block. These other computer processes can then make decisions based upon this knowledge. For example, the other processes can activate a corruption-skipping routine that allows the process to skip over the corrupted data block.

The step-forward button 350, when activated, causes the graphical user interface 100 to load the next data block in the data file. The corrupted-forward button 355, when activated, causes the graphical user interface 100 to scan forwards through the data blocks of the data file and load in the next corrupted block encountered. The auto-forward button 360, when activated, causes the graphical user interface 100 to automatically load in the subsequent data blocks in the data file being examined, and sequentially display them.

The graphical user interface 100 also contains a metadata display portion 365. The various metadata elements contained in the header 210, body 220, or tail 230 of the data block are displayed here. For example, the metadata display portion 365 contains a Format field, where the metadata in the data block relating to the block format is displayed. The format element 367 is editable. A user can select the format element 367 using the cursor control, and enter a new value for the block format metadata, using an input device such as a keyboard. The other metadata elements can similarly be edited.

Some of the metadata elements are also validated by the graphical user interface 100, or by the validation module 120 (of FIG. 1). For example, the checksum element 370 displays a checksum value, as stored in the header 210 of the data block. The checksum value is a value that is used to help determine if the data block is corrupted. In this embodiment, the checksum value is an exclusive-OR of all of the bytes of information stored in the data block 100. The checksum validation element 375 displays a checksum value calculated as of the moment the data block was loaded into the graphical user interface 100. If the calculated checksum element 375 does not match the stored checksum element 370, this means that some of the information stored in the data block has been changed since the stored checksum element 370 was generated, and the data block is likely corrupted. Similarly, the tail element 380 displays a tail value, calculated as of the time the data block was last written to. The expected tail element 383 displays a calculated value of the tail, based upon the state of the data block as of the time the data block was loaded into the graphical user interface 100: Finally, the corruption status region 385 displays a status of the data block, as calculated by the graphical user interface 100 or the associated validation module. This status is calculated based on the values in the various metadata elements of the data block, using validation logic.

The various features of the graphical user interface 100 will now be discussed in more detail. The graphical user interface 100 allows a user to view a data block of a data file, such as an Oracle 8 data file, at a low level of detail. The user can examine the metadata elements associated with the data block, as well as the data actually stored in the data block. The graphical user interface 100 performs several validation checks on the data block, such as verifying that a metadata element value is within an allowable range of values, comparing a stored checksum value with a calculated checksum value, or comparing a stored tail value with a calculated tail value, based upon the information stored in the header 110. Additionally, the graphical user interface 100 allows the user to edit the values stored in the various metadata elements, as well as edit the values stored in the data portion of the data block.

The graphical user interface 100 can search a data file for a particular binary string proviced by the user. The user selects the search function from amongst the menu options provided in the menus of the menu bar 305, and then enters the string to search for. The graphical user interface 100 then displays the next block that contains the provided search string.

The graphical user interface 100 can explicitly set the size of the data block being processed. The user selects the set block size function from amongst the menu options provided in the menus of the menu bar 305, and then enters the desired block size. The graphical user interface 100 then uses this information in processing the data blocks of the data file. This feature is useful where the header to the data file itself is damaged, or where the block size information is otherwise unavailable.

The graphical user interface 100 can jump directly to a particular block, as referenced by a block number. The user selects the goto block function from amongst the menu options provided in the menus of the menu bar 305, and then enters the desired block number. The graphical user interface 100 then uses this information to load the desired data block.

The graphical user interface 100 can output a data block to an outside process, or to a separate data file. The user selects the Search, Detect & Dump (SDD) function from amongst the menu options provided in the menus of the menu bar 305. This causes the graphical user interface 100 to step through the data blocks of the data file, and write the contents of specific data blocks, such as corrupted data blocks, to a log file. The SDD function also creates a script that identifies the specified data blocks. This script is then used by a computer process, such as a process running on the file system, data storage system or database, that the data blocks are a part of. This script identifies the specified data blocks to the process, and allows the process to take appropriate actions, within the context of the file system the process is running on. For example, where the file system is the Oracle 8 data storage system, the script is a SQL script that allows Oracle 8 to locate and dump the corrupted data blocks from within the Oracle 8 environment.

The graphical user interface 100 can also extract the data contents of a data block, and output the data contents to a separate data file. This separate data file is then read by a computer process, such as a process running on the file system, data storage system or database. The process reads the data contents stored in the separate data file, and re-introduces the data contents into a data structure, such as a database table, a text file, or a second data block. This allows data to be re-used, by being extracted from a corrupted data file and stored in an un-corrupted data structure.

The graphical user interface 100 can generate statistics about the data blocks being displayed, or about the data blocks contained in the data file being processed. These statistics provide summary information about the selected data blocks. For example, a summary of the total number of corrupted blocks, the number of blocks of each of various block types, the total size of the data file, etc., is provided.

Figure 4:
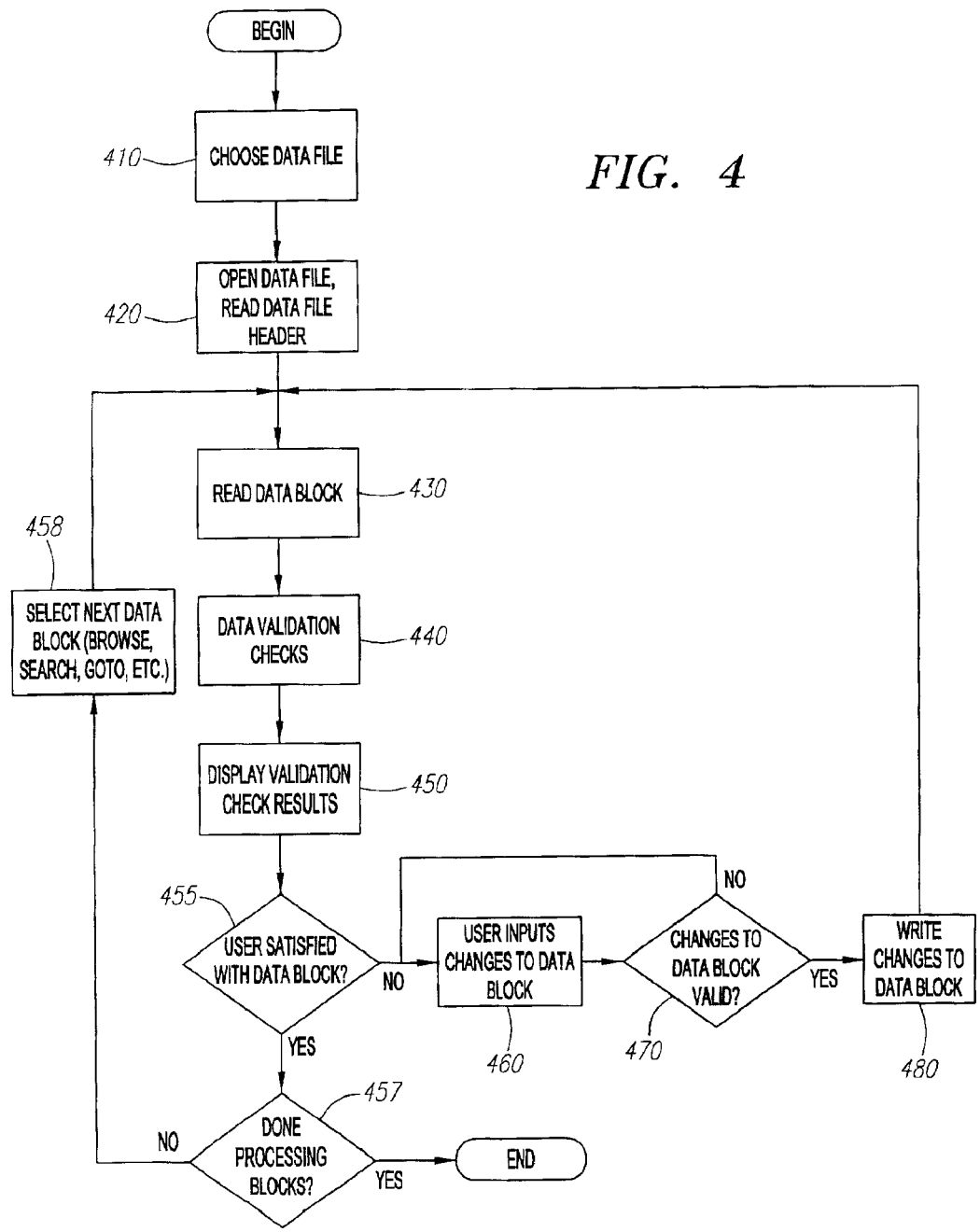
FIG. 4 is a flowchart of a method for displaying and verifying data blocks, in accordance with an embodiment of the invention.

In an embodiment, a user interacts with the graphical user interface 100 using the method of FIG. 4, with reference to the graphical user interface of FIG. 3. The user first selects the data file to be processed, at step 410. The user selects a "file open" option from the options of the menus contained in the menu bar 305, and then provides information about the data file. This information includes the data file name, and the type of the operating system that the data file was created under. The graphical user interface 100 uses this information to open the data file and read in information about the data file, at step 420. This information includes items such as the size of the file and the size of the data blocks in the data file, as well as other information.

Once the data file is open, the graphical user interface 100 reads in the first data block stored in the data file, at step 430. The graphical user interface 100, or the validation module 120 (of FIG. 1), then analyzes the data block, to determine if it is corrupted, at step 440. For example, the data block is checked to see if the information contained in the tail matches the corresponding information contained in the header. The various metadata elements, such as the block type, the version, and the flag elements, are checked to insure that they contain values within a range of valid values for the various metadata elements. The database address element (RDBA) as stored in the data block is checked to make sure that it matches the actual database address of the data block. The checksum element as stored in the data block is compared to a calculated checksum value. The results of these validation checks are displayed in the graphical user interface 100, at step 450.

If the user is satisfied with the contents of the data block being displayed, at step 455, then a check is made to see if the user is finished processing all of the data blocks of the data file, at step 457. If the user is finished with processing, then the method terminates. If the user is not finished processing, then the user selects one of the various means of loading a new data block, discussed above (browse forward, browse backwards, goto, search, corrupted-back, corrupted-forward, etc.), at step 458. Control then returns to step 430, where the selected block is loaded into the graphical user interface 100.

If the user is not satisfied with the contents of the data block being displayed, at step 455, then control passes to step 460, where the user is allowed to edit the contents of the data block. The user can change the values for the various metadata elements displayed in the metadata portion 465 of the graphical user interface 100. The user can also change the values displayed in the data portion 410. Once the user is finished making changes to the data block, the user activates the commit button 435, and the changes are checked to insure that they are valid, at step 470. The graphical user interface, or an associated validation module, checks to insure that the changes are of a proper format (e.g. hexadecimal string), that the changes are of a proper size (e.g. 1 byte for the format element 367, 4 bytes for the tail element 380), and that the changed value falls within an allowable range of values, depending on the particular metadata or data element being changed. If the changes fail this validation, then they are rejected, and control passes back to step 460 for the user to provide valid changes. If the changes are accepted, then at step 480, the changes are written back to the data file. Control then passes back to step 430, where the freshly-changed data block is then re-read from the data file.

System Architecture Overview

Figure 5:
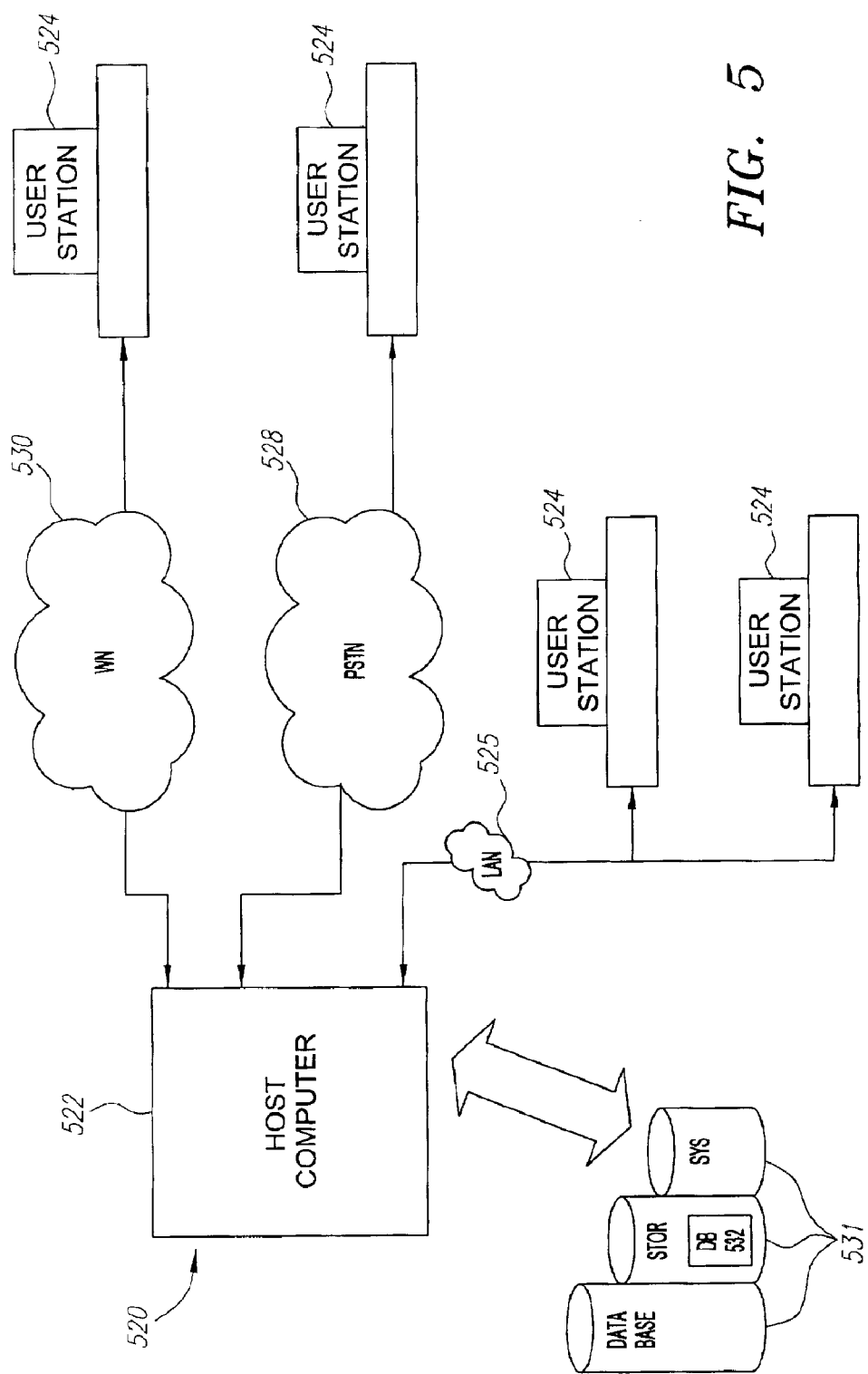
FIGS. 5 and 6 represent a computer architecture in accordance with an embodiment of the invention.

Referring to FIG. 5, in an embodiment, a computer system 520 includes a host computer 522 connected to a plurality of individual user stations 524. In an embodiment, the user stations 524 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 524 are connected to the host computer 522 via a local area network ("LAN") 525. Other user stations 524 are remotely connected to the host computer 522 via a public telephone switched network ("PSTN") 528 and/or a wireless network 530.

In an embodiment, the host computer 522 operates in conjunction with a data storage system 531, wherein the data storage system 531 contains a database 532 that is readily accessible by the host computer 522.

In alternative embodiments, the database 532 may be resident on the host computer, stored, e.g., in the host computer's ROM, PROM, EPROM, or any other memory chip, and/or its hard disk. In yet alternative embodiments, the database 532 may be read by the host computer 522 from one or more floppy disks, flexible disks, magnetic tapes, any other magnetic medium, CD-ROMs, any other optical medium, punchcards, papertape, or any other physical medium with patterns of holes, or any other medium from which a computer can read.

In an alternative embodiment, the host computer 522 can access two or more databases 532, stored in a variety of mediums, as previously discussed.

Figure 6:
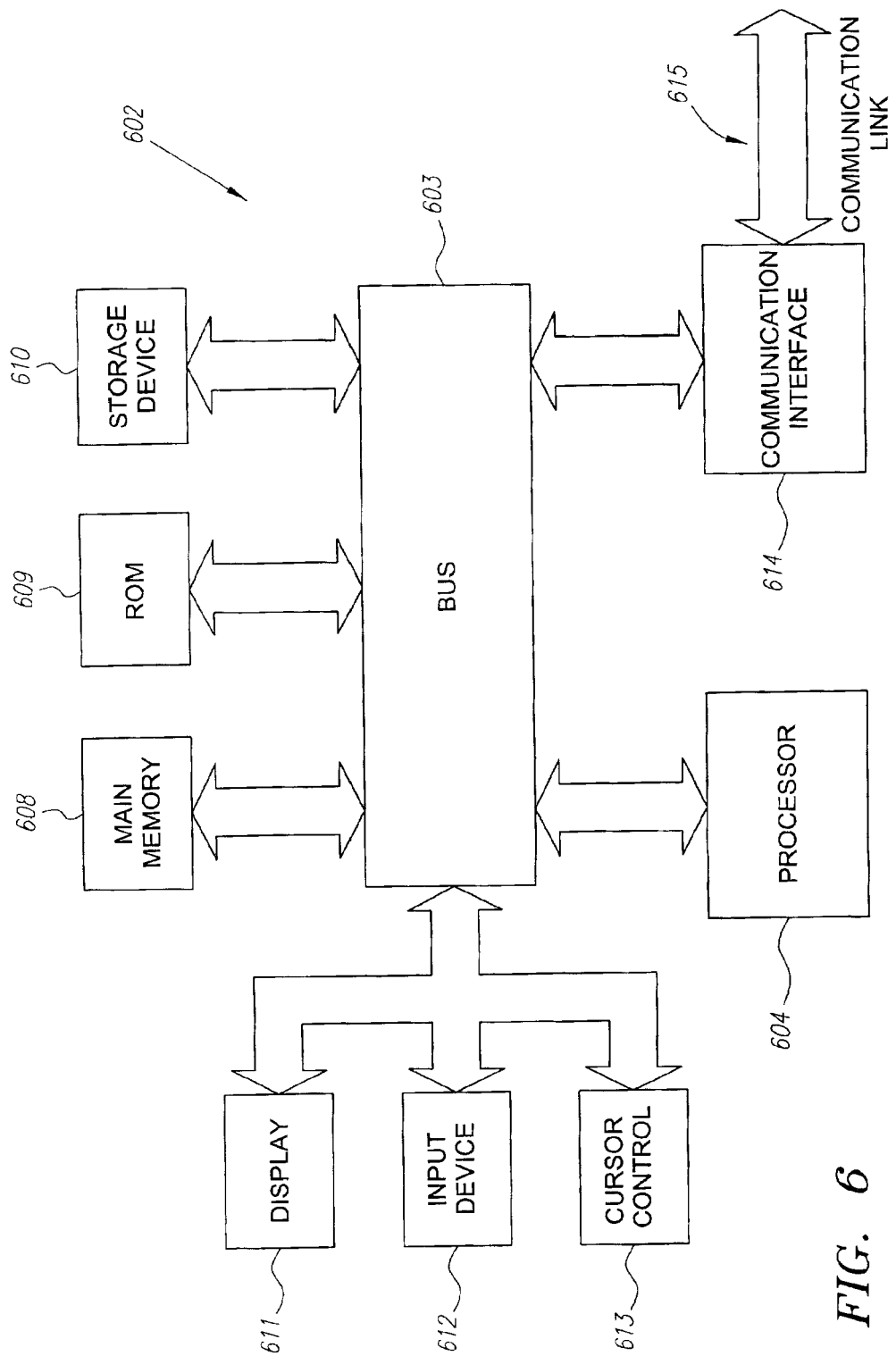

Referring to FIG. 6, in an embodiment, each user station 524 and the host computer 522, each referred to generally as a processing unit, embodies a general architecture 602. A processing unit includes a bus 603 or other communication mechanism for communicating instructions, messages and data, collectively, information, and one or more processors 604 coupled with the bus 603 for processing information. A processing unit also includes a main memory 608, such as a random access memory (RAM) or other dynamic storage device, coupled to the bus 603 for storing dynamic data and instructions to be executed by the processor(s) 604. The main memory 608 also may be used for storing temporary data, i.e., variables, or other intermediate information during execution of instructions by the processor(s) 604.

A processing unit may further include a read only memory (ROM) 609 or other static storage device coupled to the bus 603 for storing static data and instructions for the processor(s) 604. A storage device 610, such as a magnetic disk or optical disk, may also be provided and coupled to the bus 603 for storing data and instructions for the processor(s) 604.

A processing unit may be coupled via the bus 603 to a display device 611, such as, but not limited to, a cathode ray tube (CRT), for displaying information to a user. An input device 612, including alphanumeric and other keys, is coupled to the bus 603 for communicating information and command selections to the processor(s) 604. Another type of user input device may include a cursor control 613, such as, but not limited to, a mouse, a trackball, a fingerpad, or cursor direction keys, for communicating direction information and command selections to the processor(s) 604 and for controlling cursor movement on the display 611.

According to one embodiment of the invention, the individual processing units perform specific operations by their respective processor(s) 604 executing one or more sequences of one or more instructions contained in the main memory 608. Such instructions may be read into the main memory 608 from another computer-usable medium, such as the ROM 609 or the storage device 610. Execution of the sequences of instructions contained in the main memory 608 causes the processor(s) 604 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 604. Such a medium may take many forms, including, but not limited to, non-volatile, volatile and transmission media. Non-volatile media, i.e., media that can retain information in the absence of power, includes the ROM 609. Volatile media, i.e., media that can not retain information in the absence of power, includes the main memory 608. Transmission media includes coaxial cables, copper wire and fiber optics, including the wires that comprise the bus 603. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 604 can retrieve information.

Various forms of computer-usable media may be involved in providing one or more sequences of one or more instructions to the processor(s) 604 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 603 may receive the infrared signals and place the instructions therein on the bus 603. The bus 603 may carry the instructions to the main memory 608, from which the processor(s) 604 thereafter retrieves and executes the instructions. The instructions received by the main memory 608 may optionally be stored on the storage device 610, either before or after their execution by the processor(s) 604.

Each processing unit may also include a communication interface 614 coupled to the bus 603. The communication interface 614 provides two-way communication between the respective user stations 524 and the host computer 522. The communication interface 614 of a respective processing unit transmits and receives electrical, electromagnetic or optical signals that include data streams representing various types of information, including instructions, messages and data.

A communication link 615 links a respective user station 524 and a host computer 522. The communication link 615 may be a LAN 525, in which case the communication interface 614 may be a LAN card. Alternatively, the communication link 615 may be a PSTN 528, in which case the communication interface 614 may be an integrated services digital network (ISDN) card or a modem. Also, as a further alternative, the communication link 615 may be a wireless network 530.

A processing unit may transmit and receive messages, data, and instructions, including program, i.e., application, code, through its respective communication link 615 and communication interface 614. Received program code may be executed by the respective processor(s) 604 as it is received, and/or stored in the storage device 610, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

I claim:

1. A computer-implemented method for displaying validation information about a data block using a graphical user interface, comprising:

reading metadata stored within the data block, the data block stored within a computer-readable medium;

displaying the metadata, wherein the metadata is editable;

computing validation information about the metadata; and indicating whether the data block in the computer-readable medium is corrupted or not corrupted based on the validation information.

2. The computer-implemented method of claim 1, further comprising:

reading data stored in the data block; and displaying the data on the graphical user interface.

3. The computer-implemented method of claim 2, wherein the data is editable.

4. The computer-implemented method of claim 2, wherein the data is displayed in a structured format, the structured format being derived from a structure definition associated with the data.

5. The computer-implemented method of claim 2, further comprising:

selecting data to be output; and outputting the selected data to a data structure.

6. The computer-implemented method of claim 1, wherein the metadata within the data block contains a header portion and a tail portion.

7. The method of claim 5, wherein computing validation information comprises one or more of:

checking data to be in the allowable range;

comparing a checksum in the header to a calculated checksum;

comparing a set of consistency information stored in the tail to a calculated set of consistency information.

8. The computer-implemented method of claim 1, wherein the data block is an Oracle data block.

9. The computer-implemented method of claim 1, wherein the indicating comprises displaying the validation information about the metadata.

10. The method of claim 1, further comprising, repairing the data in the data block if the data is indicated as corrupt.

11. A computer processing system for displaying and validating information about a data block, comprising:

a graphical user interface for indicating whether the data block stored within a computer-readable medium is corrupted or not corrupted, the graphical user interface comprising a first region for displaying metadata associated with the data block and a second region for displaying validation information, the validation information being based at least in part on the metadata associated with the data block; and a validation module for reading the metadata, and computing validation information about the metadata.

12. The system of claim 11, wherein the metadata displayed in the first region is editable.

13. The system of claim 11, further comprising a third region for displaying data stored in the data block.

14. The system of claim 13, wherein the data displayed in the third region is editable.

15. The system of claim 11, further comprising a script generation module, wherein the script generation module automatically generates a script that, when executed on the data file, parses the data file and extracts data contained within a data block within the data file.

16. The system of claim 15, wherein the data block is a corrupted data block.

17. The system of claim 11, further comprising, a repair module for repairing the data in the data block if the data is indicated as corrupt.

18. The system of claim 11, wherein the validation module further comprises means for checking data to be in the allowable range;

means for comparing a checksum stored in the header to a calculated checksum;

means for comparing a set of consistency information stored in the tail to a calculated set of consistency information.

19. A computer program product that includes a medium useable by a processor, the medium having stored thereon a sequence of instructions which, when executed by said processor, causes said processor to execute a computer-implemented method for displaying information about a data block using a graphical user interface, comprising:

reading metadata stored within the data block, the data block stored within a computer-readable medium;

displaying the metadata, wherein the metadata is editable;

computing validation information about the metadata; and indicating whether the data block in the computer-readable medium is valid or invalid corrupted or not corrupted based on the validation information.

20. The computer program product of claim 19, further comprising:

reading data stored in the data block; and displaying the data on the graphical user interface.

21. The computer program product of claim 20, wherein the data is editable.

22. The computer program product of claim 20, wherein the data is displayed in a structured format, the structured format being derived from a structure definition associated with the data.

23. The computer program product of claim 20, further comprising:

selecting data to be input; and outputting the selected data to a data structure.

24. The computer program product of claim 19, wherein the metadata within the data block contains a header portion and a tail portion.

25. The computer program of claim 24, wherein computing validation information comprises one or more of:

checking data to be in the allowable range;

comparing a checksum stored in the header to a calculated checksum;

comparing a set of consistency information stored in the tail to a calculated set of consistency information.

26. The computer program product of claim 19, wherein the data block is an Oracle data block.

27. The computer program product of claim 19, wherein the indicating comprises displaying the validation information about the metadata.

28. The computer program product of claim 19, further comprising:

repairing the data in the data block if the data is indicated as corrupt.

* * * * *

UNITED STATES PATENT AND TRADEMARK OFFICE
CERTIFICATE OF CORRECTION

| | | |
|---|---|---|
| PATENT NO. | : 6,954,746 B1 | Page 1 of 1 |
| APPLICATION NO. | : 09/8724707 | |
| DATED | : October 11, 2005 | |
| INVENTOR(S) | : Carlos M. Batista | |

It is certified that error appears in the above-identified patent and that said Letters Patent is hereby corrected as shown below:

Claim 19, Col. 11, line 15, immediately after "is", please delete --valid or invalid--.

Signed and Sealed this

Fifteenth Day of August, 2006

JON W. DUDAS
*Director of the United States Patent and Trademark Office*